Feb. 15, 1949.  J. R. CLARK  2,461,721
EGG INSPECTION TABLE FOR MOVING INDIVIDUALLY
SEPARATED EGGS ACROSS A LIGHT SOURCE
Filed July 29, 1946
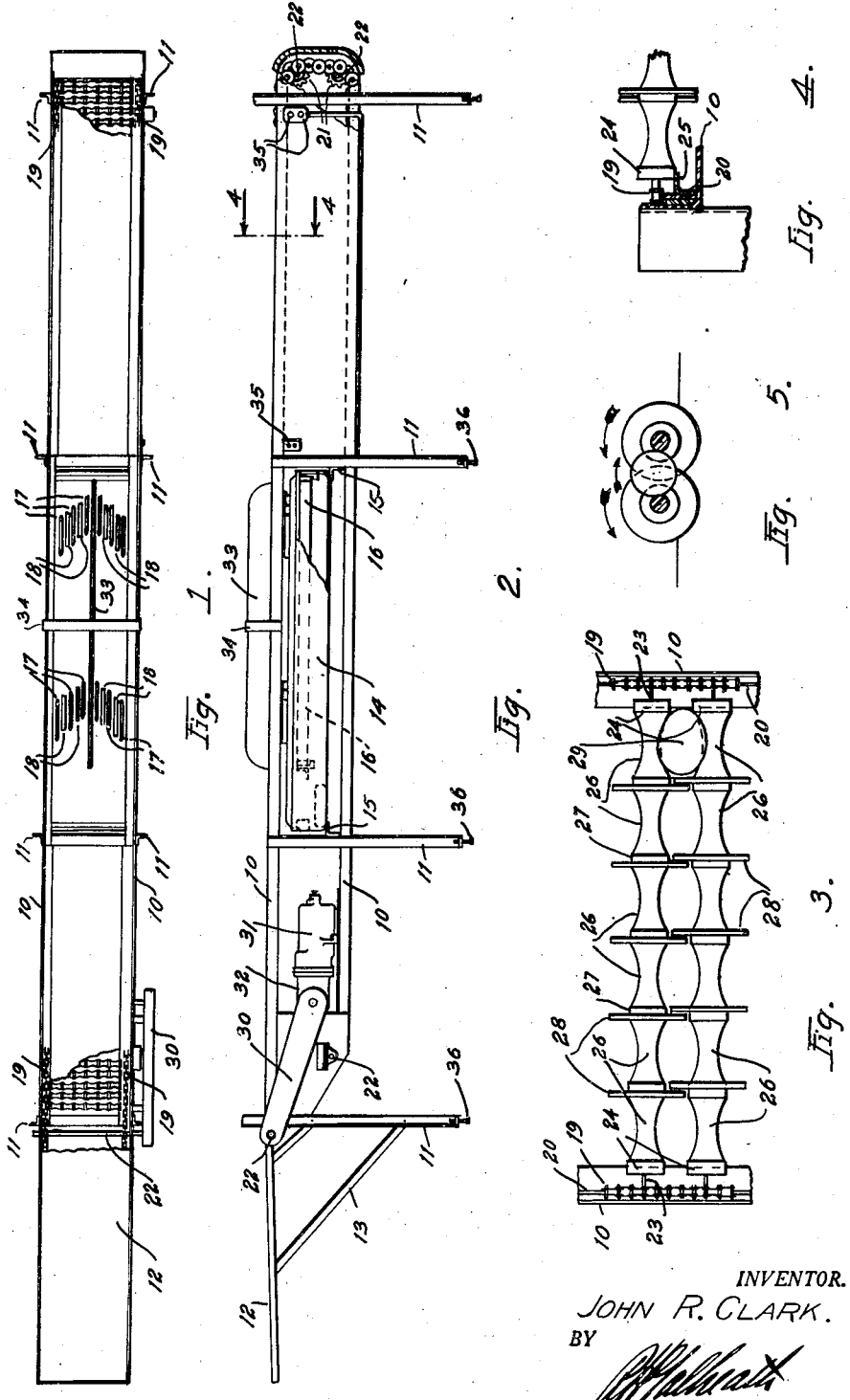
INVENTOR.
JOHN R. CLARK.
BY
ATTORNEY.

Patented Feb. 15, 1949

2,461,721

UNITED STATES PATENT OFFICE 2,461,721

EGG INSPECTION TABLE FOR MOVING INDIVIDUALLY SEPARATED EGGS ACROSS A LIGHT SOURCE

John R. Clark, Denver, Colo., assignor of fifty per cent to Cecil D. Hingley and Ernest A. Hingley Application July 29, 1946, Serial No. 686,931

2 Claims. (Cl. 88—14.6)

1

This invention relates to a table for grading eggs, and has for its principal object the provision of a simple and highly efficient grading table which will move the eggs in individually separated relation across a light source so that an inspector can quickly and easily separate the different grades of eggs.

Another object of the invention is to provide a device which will rotate the eggs so that they can be viewed from all sides, and to so construct the device that damage to the eggs will be reduced to a minimum.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved egg grading table;

Fig. 2 is a side view thereof;

Fig. 3 is an enlarged, detail, fragmentary view, illustrating a grading roller used on the improved table;

Fig. 4 is an enlarged, detail section, taken through one edge of the table on the line 4—4, Fig. 2; and Fig. 5 is a diagrammatic view, illustrating the rotating action of the rollers on an egg.

The improved egg grading table consists of an elevated frame comprising four longitudinally extending members 10, preferably formed of an angle iron, supported upon suitable legs 11.

It is essential that the frame be installed level in order to obtain proper action on the eggs. For this reason, leveling screws 36 are provided on the legs whereby the table can be brought to a perfectly level position.

The frame terminates at one extremity in a packing table 12, supported from bracket members 13, upon which the trays and egg cases are supported for receiving the eggs.

At the middle of the frame a light box 14 is supported on suitable angle brackets 15. Fluorescent lamp tubes 16 are positioned in the light box. The light from the tubes 16 passes through a plurality of slots 17 in the top of the box. The individual slots are separated by means of shields 18 to confine the vertical rays from the lamp tubes.

2

Two endless roller chains 19 extend throughout the length of the frame. The horizontal reaches of these chains are supported upon vertical track members 20 which are in turn supported by the frame members 10. The chains are trained over suitable chain sprockets 21 mounted on sprocket shafts 22 at each extremity of the frame.

The chains support a plurality of uniformly spaced-apart roller shafts 23, each of which carries a specially designed roller 24. The extremities of the rollers 24 roll along roller tracks 25 supported from the angle members 10.

Each of the rollers is shaped to provide a plurality of adjacent arcuate depressions 26 separated by cylindrical portions 27. A separating disc 28 is mounted on each cylindrical portion 27, the discs on alternate rollers being staggered so as to overlie the adjacent discs, as shown in Fig. 3. The rollers are spaced and the depressions are designed to provide pockets in which the eggs will be supported, as illustrated at 29.

The chains are driven so that the upper rollers will travel toward the table 12 by means of a conventional power transmission 30 driven from an electric motor 31 through the medium of a typical speed reducer 32. Suitable control buttons 35 are positioned convenient to the operators, whereby the motor 31 can be stopped and started as and when desired.

In use, the inspectors or graders stand along opposite sides of the light box, and the eggs are unpacked and placed in the pockets between the rollers at the extremity distant from the packing table. The eggs are carried the full length of the frame by the travel of the chains 19 and are simultaneously rotated in a direction opposite to the rotation of the rollers, as indicated in Fig. 5.

As the eggs pass over the light slits 17, they are internally illuminated so that any internal specks or defects can be detected and the defective eggs removed.

The discs 28, acting in cooperation with the shields 18, confine the light rays to each particular egg as it passes thereover and prevent the light from striking the eyes of the inspectors. A dividing partition 33 is supported along the middle of the frame over the light box by means of a suitable supporting bracket 34 to prevent the eggs and lights on one side of the table from distracting the attention of the inspector on the other side.

If desired, the eggs may be assorted by the inspectors into rows of different grades so that the packers at the table 12 will know the grades by their position on the rollers.

The rollers may be formed of wood, and the discs 28 may be formed of rubber to reduce breakage. The rollers and the discs may be molded as a unit from rubber, if preferred, to still further reduce the possibility of damage.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. In an egg inspection table of the type having a light box and a traveling series of grooved rollers adapted to support the eggs individually between the grooves of adjacent rollers and over said light box, means for confining light rays to each individual row of eggs, comprising: circular, light-shielding discs mounted on each roller, the discs being positioned between the grooves of the roller and the discs on adjacent rollers overlapping each other to form continuously extending, spaced apart, traveling light shields throughout the entire length of the series of rollers.

2. In an egg inspection table of the type arranged to move aligned rows of individually separated eggs over a light source, means for directing and confining light rays to each individual row of eggs comprising: an elongated light box positioned below the moving eggs; an elongated light source in said box; a top over said box; a relatively narrow, elongated light slot formed in said top under each row of eggs, parallel to the direction of travel thereof; a vertical elongated light shielding member arising from between the adjacent slots to prevent the light rays from each slot from reaching the adjacent rows of eggs; and rows of overlapping vertical light shields positioned between the rows of eggs and moving therewith to prevent the illumination of one row of eggs from illuminating the eggs in the adjacent rows; a vertical dividing partition; and means for supporting said dividing partition above said eggs parallel to the paths of travel thereof so that there will be an equal number of rows of eggs on each side of said partition, said dividing partition acting to prevent the illuminated eggs at each side of said table from being visible from the other side thereof.

JOHN R. CLARK.

REFERENCES CITED

The following references are of record in the file of this patent:

UNITED STATES PATENTS

| Number | Name | Date |
|---|---|---|
| 1,514,281 | Grubb | Nov. 4, 1924 |
| 1,728,462 | Wyland | Sept. 17, 1929 |
| 1,796,699 | Wyland | Mar. 17, 1931 |
| 1,930,621 | Meyer | Oct. 17, 1933 |
| 2,308,190 | Magnuson | Jan. 12, 1943 |